(12) United States Patent
Przestrzelski et al.

(10) Patent No.: US 9,377,995 B2
(45) Date of Patent: Jun. 28, 2016

(54) COMPARING EVENT DATA SETS

(71) Applicant: International Business Machines Corporation, Armonk, NY (US)

(72) Inventors: Piotr Przestrzelski, Cork (IE); Eric Thiebaut-George, Cork (IE)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 13/866,383

(22) Filed: Apr. 19, 2013

(65) Prior Publication Data
US 2013/0282330 A1 Oct. 24, 2013

(30) Foreign Application Priority Data

Apr. 20, 2012 (GB) .................................. 1206932.4

(51) Int. Cl.
*G04F 3/00* (2006.01)
*G06F 7/02* (2006.01)
*G04F 13/00* (2006.01)
*G06F 17/18* (2006.01)
*G06K 9/00* (2006.01)
*G06F 17/10* (2006.01)

(52) U.S. Cl.
CPC *G06F 7/02* (2013.01); *G04F 13/00* (2013.01); *G06F 17/10* (2013.01); *G06F 17/18* (2013.01); *G06K 9/00523* (2013.01)

(58) Field of Classification Search
CPC .. G06K 9/4609; G06K 9/00523; G06F 17/10; G06F 7/02

USPC ........................... 702/176, 178, 189; 707/603
See application file for complete search history.

(56) References Cited

U.S. PATENT DOCUMENTS

| 6,732,064 | B1 | 5/2004 | Kadtke et al. |
|---|---|---|---|
| 7,602,870 | B2 | 10/2009 | Awad |
| 8,064,552 | B2 | 11/2011 | Chester et al. |
| 8,078,663 | B2 | 12/2011 | Wilson et al. |
| 2003/0225877 | A1 | 12/2003 | Packman et al. |
| 2007/0086635 | A1 | 4/2007 | Fink et al. |
| 2011/0060703 | A1 | 3/2011 | Alaniz |

OTHER PUBLICATIONS

Pattem et al., "The Impact of Spatial Correlation on Routing with Compression in Wireless Sensor Networks", Information Processing in Sensor Networks, Third International Symposium, 2004, 8 pages.
Wang et al., "Clustering by Pattern Similarity in Large Data Sets", Proceedings of the 2002 ACM SIGMOD International Conference on Management of Data, 2002, 12 pages.
Zhang et al., "Fast Statistical Relationship Discovery in Massive Monitoring Data", NEC Laboratories America, 2008, 20 pages.

(Continued)

*Primary Examiner* — An Do
(74) *Attorney, Agent, or Firm* — Yee & Associates, P.C.; Richard A. Wilhelm

(57) ABSTRACT

An apparatus for comparing event data sets. A system and computer program for comparing event data sets comprising: calculating one or more derivatives for each event in a first and second set of events; classifying each event by the calculated derivatives; and evaluating a similarity of the first and second sets of events based on the classifications of the respective events.

13 Claims, 15 Drawing Sheets

(56) References Cited

OTHER PUBLICATIONS

Zhou et al., "Efficient Discovery of Confounders in Large Data Sets", Ninth IEEE International Conference on Data Mining, 2009, 10 pages.

Bo, "Non-Linear Correlation Discover-Based Technique in Data Mining", International Symposium on Intelligent Information Technology Application Workshops, 2008, pp. 107-111.

Przestrzel et al., "Comparing Event Data Sets," U.S. Appl. No. 14/487,181, filed Sep. 16, 2014, 36 pages.

Office Action, dated Nov. 20, 2015, regarding U.S. Appl. No. 14/487,181, 11 pages.

| Event Classification Policy 500 |||
|---|---|---|
| Letter symbol | First & Second Derivative | Graph |
| A | ++ (positive, positive) |  |
| B | +0 (positive, neutral) |  |
| C | +- (positive, negative) |  |
| D | 00 (neutral, neutral) |  |
| E | -- (negative, negative) |  |
| F | -0 (negative, neutral) |  |
| G | -+ (negative, positive) |  |

| Event Classification Policy Mapping 502 ||||
| --- | --- | --- | --- |
| Letter Symbol | First & Second Derivative | Inverse Derivative | Inverse Symbol |
| A | ++ | -- | G |
| B | +0 | -0 | F |
| C | +- | -+ | E |
| D | 00 | 00 | D |
| E | -- | ++ | A |
| F | -0 | +0 | B |
| G | -+ | +- | C |

Event Set Table 202

| | 1 | 2 | 3 | 4 | 5 | |
|---|---|---|---|---|---|---|
| M1 | -- | -- | ++ | +- | -0 | Derivatives |
| M2 | +- | -+ | -- | +0 | 00 | |
| M3 | +- | -0 | +- | - 0 | 00 | |
| M1 | E | E | A | C | F | Classification |
| M2 | C | G | E | B | D | |
| M3 | C | F | C | F | D | |
| M1' | | | | | | Inversion |
| M2' | | | | | | |
| M3' | | | | | | |

Event Classification Table 208

FIGURE 10

|     | 1   | 2   | 3   | 4   | 5   |                |
| --- | --- | --- | --- | --- | --- | -------------- |
| M1  | --  | --  | ++  | +-  | -0  | Derivatives    |
| M2  | +-  | -+  | --  | +0  | 00  |                |
| M3  | +-  | -0  | +-  | - 0 | 00  |                |
| M1  | E   | E   | A   | C   | F   | Classification |
| M2  | C   | G   | E   | B   | D   |                |
| M3  | C   | F   | C   | F   | D   |                |
| M1' | C   | C   | G   | E   | B   | Inversion      |
| M2' | E   | A   | C   | F   | D   |                |
| M3' | E   | B   | E   | B   | D   |                |

Event Classification Table 208

FIGURE 11

| Event Classification Policy 500' ||||
|---|---|---|---|
| Classification | 1st, 2nd, 3rd Derivative | Inverse Derivative | Inverse Symbol |
| A | +++ | --- | O |
| B | ++0 | --0 | N |
| C | ++- | --+ | M |
| D | +00 | -00 | L |
| E | +-+ | -+- | K |
| F | +-0 | -+0 | J |
| G | +-- | -++ | I |
| H | 000 | 000 | H |
| I | -++ | +-- | G |
| J | -+0 | +-+ | F |
| K | -+- | +-+ | E |
| L | -00 | +00 | D |
| M | --+ | ++- | C |
| N | --0 | ++0 | B |
| O | --- | +++ | A |

FIGURE 13

Event Set Table 202'

| | 1 | 2 | 3 | 4 | 5 | |
|---|---|---|---|---|---|---|
| M1 | -++ | -+- | ++- | +-+ | -++ | Derivatives |
| M2 | +-+ | --+ | -+- | +00 | 000 | |
| M3 | +-+ | -00 | +-- | -00 | 000 | |
| M1 | I | K | C | E | I | Classification |
| M2 | E | M | K | D | H | |
| M3 | E | L | G | L | H | |
| M1' | G | E | M | K | G | Inversion |
| M2' | K | C | E | L | H | |
| M3' | K | D | I | D | H | |

Event Classification Table 208'

FIGURE 14

COMPARING EVENT DATA SETS

FIELD OF THE INVENTION

This invention relates to a method and apparatus for comparing event data sets.

BACKGROUND

A number of algorithms discover correlations of numeric data sets and most of these rely on complex computations. Arithmetic complexity brings limitation when large amounts of data need to be analyzed in real time, for example, correlation of big data sets of a big sequence of metrics must be discovered in real time constraints.

Existing algorithms produce are described in the following publications.

IEEE conference publication "Fast statistical relationship discovery in massive monitoring data" INFOCOM Workshops 2008, IEEE, date of conference: 13-18 Apr. 2008, author Hui Zhang.

Bo Liu, "Non-Linear Correlation Discovery-Based Technique in Data Mining" 2008 International Symposium on Intelligent Information Technology Application Workshops pp. 107-111.

Therefore, there is a need in the art to address the aforementioned problem.

BRIEF SUMMARY OF THE INVENTION

The present embodiments describe a novel way of discovering correlation sequences within data sets.

In a first aspect of the invention, there is provided a method of comparing event data sets comprising: calculating one or more derivatives for each event in a first and second set of events; classifying each event by respective calculated derivatives; and correlating the first and second sets of events based on the classifications of the respective events. The preferred embodiments use a discovery approach that assumes a process having a defined set of metrics. The metric values are sampled with constant sampling interval and stored as metric data for each sequence. The metric values are continuous in that the shorter the sampling period, the smaller is change of metric value. The preferred embodiments use a process for finding all the sequences of correlated metrics for a given correlation percentage, for example, finding all the correlation sequences where the metrics in each sequence are similar to each other directly or indirectly in at least 90%.

Advantageously, the preferred embodiment clusters metric values based on first and second derivative of the metric and then maps the clustered values between pairs of metrics. The type of similarity between metrics is defined by type of map used.

A second embodiment clusters metric values based on a first, second and third derivative for more precision but at a processing cost.

The derivatives are calculated from sequences of samples. More advantageously the first derivative is calculated as the difference between two consecutive samples divided by the difference of their timestamps and the second derivative is calculated respectively as the difference of two consecutive first derivative values divided by their timestamps difference. With a constant sampling interval, the timestamps difference can be normalized and assumed to be unity to simplify calculations. Metric data classification is based on sign of the derivatives (positive, neutral, negative). For each timestamp (except for first or last two timestamps), both first and second derivative is calculated. Based on the sign of the first and second derivative, a letter classifying the metric behavior at a given timestamp is evaluated. Effectively, the sequence of metric values is translated into a sequence of letters. In the second embodiment, the third derivative is calculated as the difference of two consecutive second derivative values divided by their time stamp difference.

Sequences of letters for two different metrics are either directly compared or compared after some transformation of one of the sequences. The number of matches to the number of all pairs of letters is the percentage similarity between the two metrics.

The embodiments do not involve intensive arithmetic operations. Converting doubles to letters takes time proportional to the number of doubles so is negligible whereas the rest of the algorithm is proportional to the square of the number of doubles and is faster because the operation is performed on characters and not doubles. The embodiments can be used where processing time is limited due to large data sets or big number of metrics and it is possible to indicate the minimum required similarity percentage of metrics in the sequences.

Advantageously, a first derivative is approximated as a distance between two consecutive events divided by the difference of their time stamps.

More advantageously, wherein a second derivative is approximated as the distance between two consecutive first derivatives divided by the difference of the time stamps.

Most advantageously, a third derivative is approximated as the distance between two consecutive second derivatives divided by the difference of the time stamps.

Preferably the difference in timestamps is a unit value for simplification. Such an approximation is advantageous and possible with a constant sampling interval.

More preferably further comprising a first derivative noise level as a fraction of a maximum derivative value whereby if a first derivative is between the absolute first derivative noise level then the first derivative is taken as neutral. Similarly, a second derivative noise level is assumed to be a fraction of a maximum second derivative value whereby a second derivative value between the absolute second noise level is taken as neutral.

Most preferably further comprising smoothing the metrics to reduce noise.

Suitably each derivative is classified as a negative, zero or positive value and each event is classified according to a combination of negative, zero and positive values of the derivatives.

More suitably, correlation of the sequences is determined if the similarity of classification is above a threshold similarity.

Most suitably, each of derivative classifications in a sequence is inverted and an anti-correlation is determined if the similarity of classification between the inverted sequence and a non-inverted sequence of events is above a threshold similarity.

Advantageously, the present invention allows correlation to be carried out between datasets with a method that saves on computing resources, rather than having to achieve an exhaustive analysis between datasets.

In a second aspect of the invention, there is provided a system for comparing event data sets comprising: calculating engine for calculating one or more derivatives for each event in a first and second set of events; classifying engine for classifying each event by respective calculated derivatives; and correlating engine for correlating the first and second sets of events based on the classifications of the respective events.

Viewed from a further aspect, the present invention provides a computer program product for comparing event data sets, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

BRIEF DESCRIPTION OF THE DRAWINGS

Preferred embodiments of the present invention will now be described, by way of example only, with reference to the following drawings in which:

FIG. 6 is an example event classification mapping policy for the preferred embodiment;

FIG. 8 is an event classification table aligned with the event set table of the example in

FIG. 6;

FIG. 10 shows classifications added to the event classification table of FIG. 9 in accordance with the preferred embodiment;

FIG. 11 shows inversions added to the event classification table of FIG. 10 in accordance with the preferred embodiment;

FIG. 13 is an example event classification policy with mapped inversions for the second embodiment;

FIG. 14 is an example set of event curves shown inside an event set table together with an event classification table contains derivatives, classifications and inversions in accordance with the second embodiment.

DETAILED DESCRIPTION OF THE EMBODIMENTS

Figure 1:
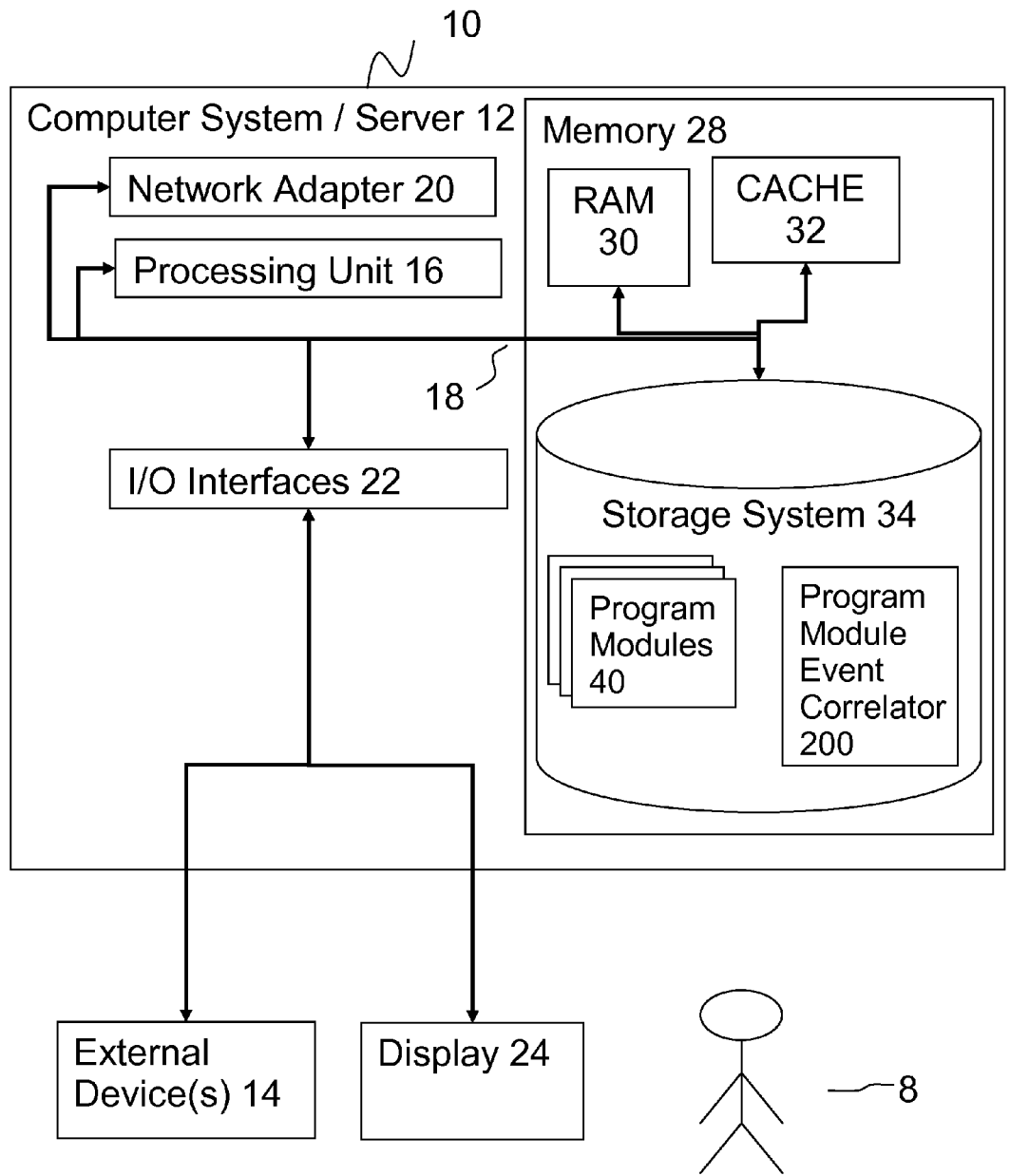
FIG. 1 is a deployment diagram of the system of the embodiments.

Referring to FIG. 1, there is shown a component diagram of a computer system node 10 according to the prior art. Computer system node 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer system/server 12 in computer system node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30; cache memory 32 and storage system 34. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

A set of program modules 40 including program module event correlator 200, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. At least one program module 200 is provided to carry out the functions and/or methodologies of embodiments of the invention as described herein. Computer system/server 12 may also communicate with one or more external devices 14 such as a keyboard, a pointing device, a display 24, etc.; one or more devices that enable a user 8 to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems.

Figure 2:
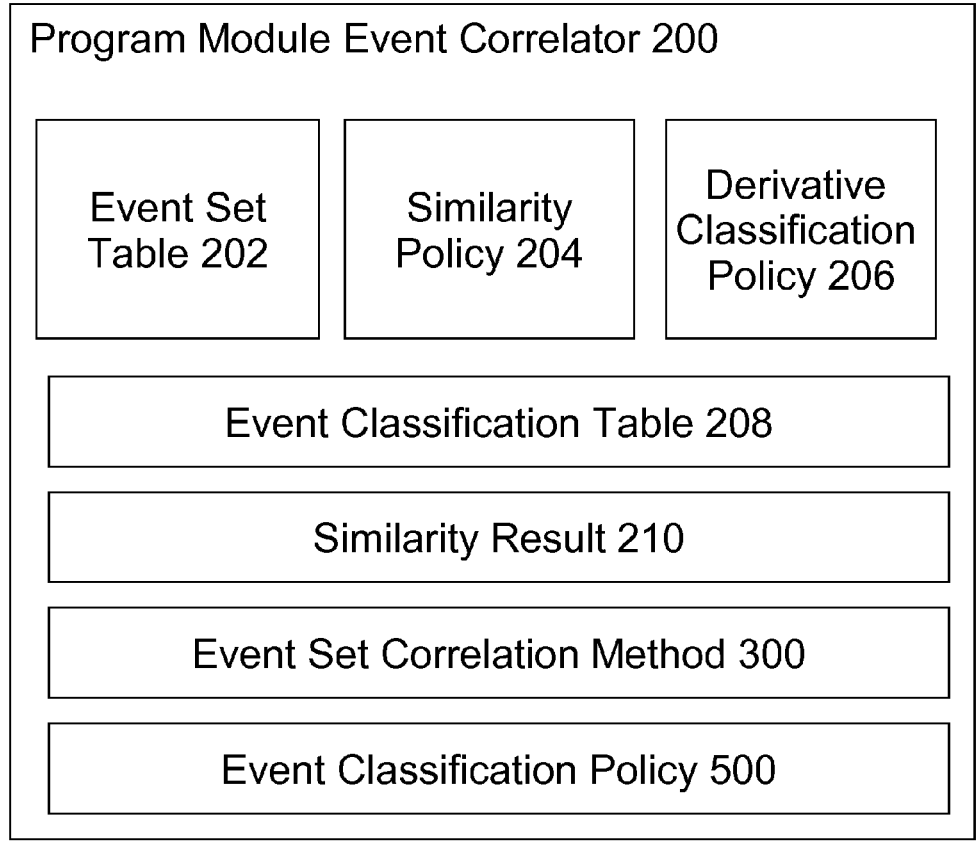
FIG. 2 is a component diagram of an event correlator of the embodiments.

Referring to FIG. 2, a program module event correlator 200 of the preferred embodiment. Event correlator 200 comprises: event set table 202; similarity policy 204; derivative classification policy 206; event classification table 208; similarity result 210; event set correlation method 300; and event classification policy 500.

Event set table 202 comprises a data structure for storing two or more sets of event data.

Similarity policy 204 comprises rules for defining when a set of events is similar and how similarity is calculated.

Derivative classification policy 206 comprises rules defining how derivatives are classified.

Event classification table 208 comprises rules defining how events are classified. Similarity result 210 is a register for storing the result of the correlations.

Event classification policy 500 comprises classification type definitions of derivative combinations allowed for and is described in more detail below with respect to FIG. 5.

Event set correlation method 300 is the method for correlating stored event sets and is described in more detail below with respect to FIG. 3.

Figure 3:
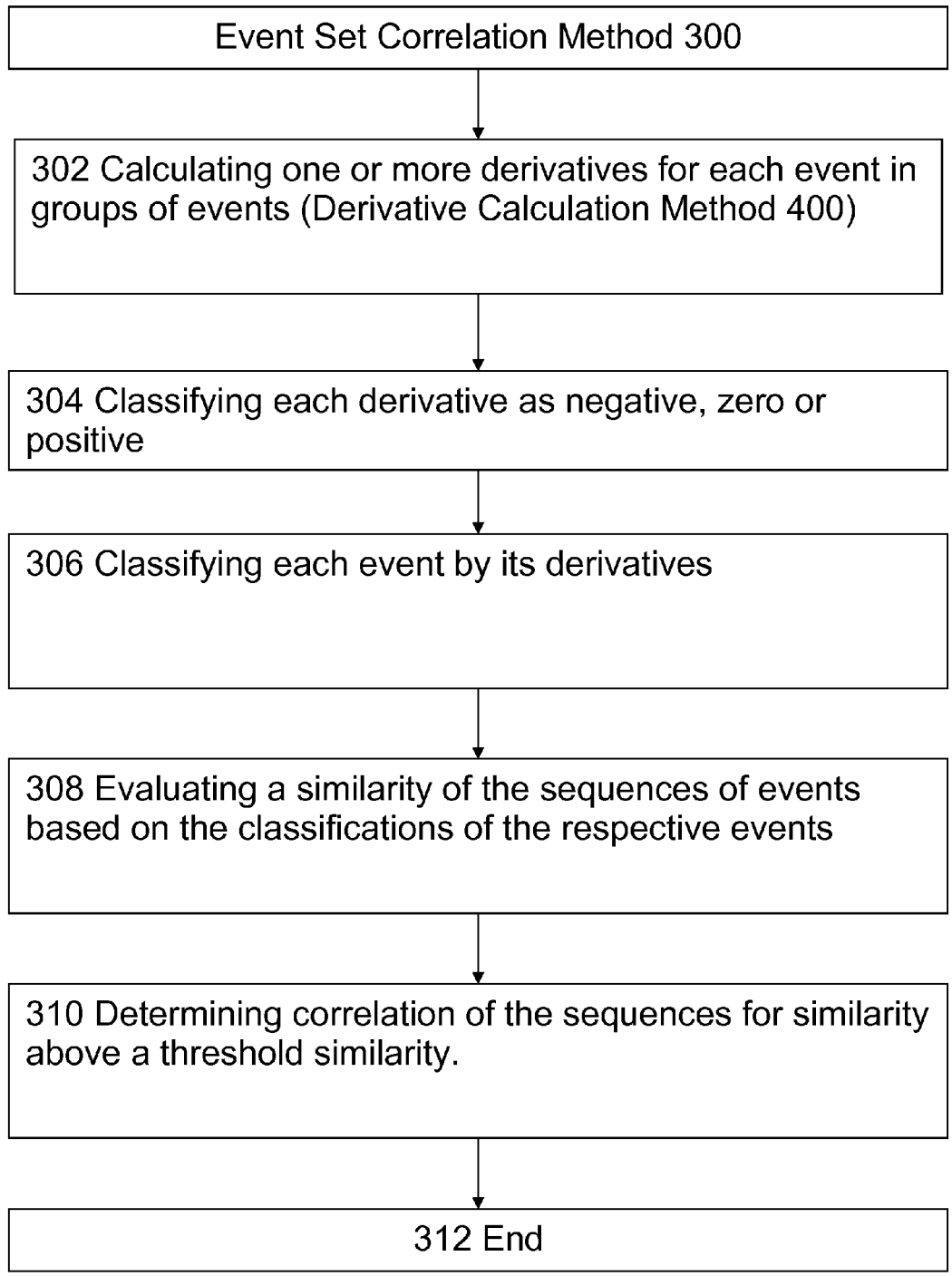
FIG. 3 is process diagram of a correlation method of the embodiments.

Referring to FIG. 3, event set correlation method 300 of the present embodiment of the invention comprises logical process steps 302 to 312.

Step 302 is for calculating one or more derivatives for each event in a first and second set of events. In the preferred embodiment, the derivatives are calculated using derivative calculation method 400. The second embodiment uses a method similar to method 400 but adapted to calculate three derivatives.

Step 304 is for classifying each derivative as negative, zero or positive after normalizing the derivatives for noise effects. Noise is a short and relatively small change of value of the derivative from a theoretical real value. In the embodiments, normalization is based on an assumed maximum absolute value for first and second derivative. In the preferred embodiment, the maximum level of noise is assumed as 10% of maximum absolute value of the derivatives. In other embodiments, a smoothed average of the raw metric (a simple filter) can be used to reduce noise and the derivatives calculation and the noise level normalization are performed on smoothed average of raw metric data.

If absolute noise level of first derivative is n1 (for example 10% of the maximum absolute value), and when $-n1 \leq s'i \leq n1$, then value s'i is assumed to be neutral (where s'i is any one of the derivatives). Similarly, if absolute noise level of second derivative is n2, and $-n2 \leq s''i \leq n2$, then value s''i is assumed neutral (where s''i is any one of the second derivatives). Both the first and second derivative value can be classified as: if $s'i > n1$ then positive; if $s'i < -n1$ then negative; if $-n1 \leq s'i \leq n1$ then neutral; if $s''i > n2$ then positive; if $s''i < -n2$ then negative; and if $-n2 \leq s''i \leq n2$ then neutral. The same technique applies for further derivatives.

Step 306 is for classifying each event by its derivatives. The result of the process is a sequence of letters A to G for all the timestamps of a given metric data set.

Step 308 is for evaluating a correlation of the first and second sequence of events based on the classifications of the respective events.

The preferred and second embodiments uses a first correlation evaluation 'as is' comparison of sequences of letter sequences at any given timestamp. The following outcomes are possible: classification letters for both metrics exist and are equal (match); classification letters for both metrics exist but differ; classification letter for one or both of the metrics do not exist. The number of matches divided by number of timestamps where classification letters for both metrics exist (multiplied by 100) is the similarity percentage for correlation on first and second derivation mapping.

The preferred and second embodiments use a second correlation evaluation to look for anti-correlation when sequences of letters of one of the data sets are first translated according to mapping: A->G; B->F; C->E; D->D; E->C; F->B and G->A (in the first embodiment as defined by the mapping table 502). The classifications are compared and the result is the similarity percentage for anti-correlation mapping.

Other embodiments could use a fuzzy logic formula to find similarity between the data sets. For example, the formula below attempts to find the total minimum difference between a numerical classification:

$$\text{Similarity} = \text{Sum for all pairs } (1 - \text{abs}(L1 - L2) * 0.2)/\text{all pairs} * 100\%$$

In the above formula L1 and L2 represent respective numerical values for the classification (A=41 h, B=42 h ...). A similarity factor of '0.2' comes from the maximum 'distance' between the numerical classification where the difference from A to F is 5 then $\text{abs}(L1-L2)*0.2$ is 1 and the result of the expression is zero. A different similarity factor would be needed for the first embodiment's A to G and the second embodiment's A to O. For all pairs of metrics, a similarity percentage is calculated for correlation and anti-correlation mapping, the best similarity percentage is recorded. With the results of mutual similarity for all the pairs of metrics, it is easy to discover sequences where direct similarity is no less than a given percent. Another fuzzy logic approach uses indirect similarity to overcome some local anomalies. If similarity between metrics M1 and M2 is 90% and the number of pairs is 100 then 90 of pairs of letters match and 10 pairs do not match. If the similarity between metrics M2 and M3 is also 90% over the same set of 100 timestamps, then 90 pairs match and 10 pairs do not match. The maximum possible similarity value of M1 and M3 is 100% when 10 M2 non-matching pairs actually match on (M1, M3). The minimum possible similarity value is 80% where the pairs that don't match on (M1, M2) also don't match on (M1, M3) as well as the 10 pairs that don't match on (M2, M3). With indirect similarity approach, there is no need to evaluate direct similarity between M1 and M3 and processing time can be significantly reduced.

M1 and M3 are allocated to common correlation group without direct similarity being calculated. Indirect similarity can also overcome some local anomalies.

Step 312 is the end of event set correlation method 300.

Figure 4:
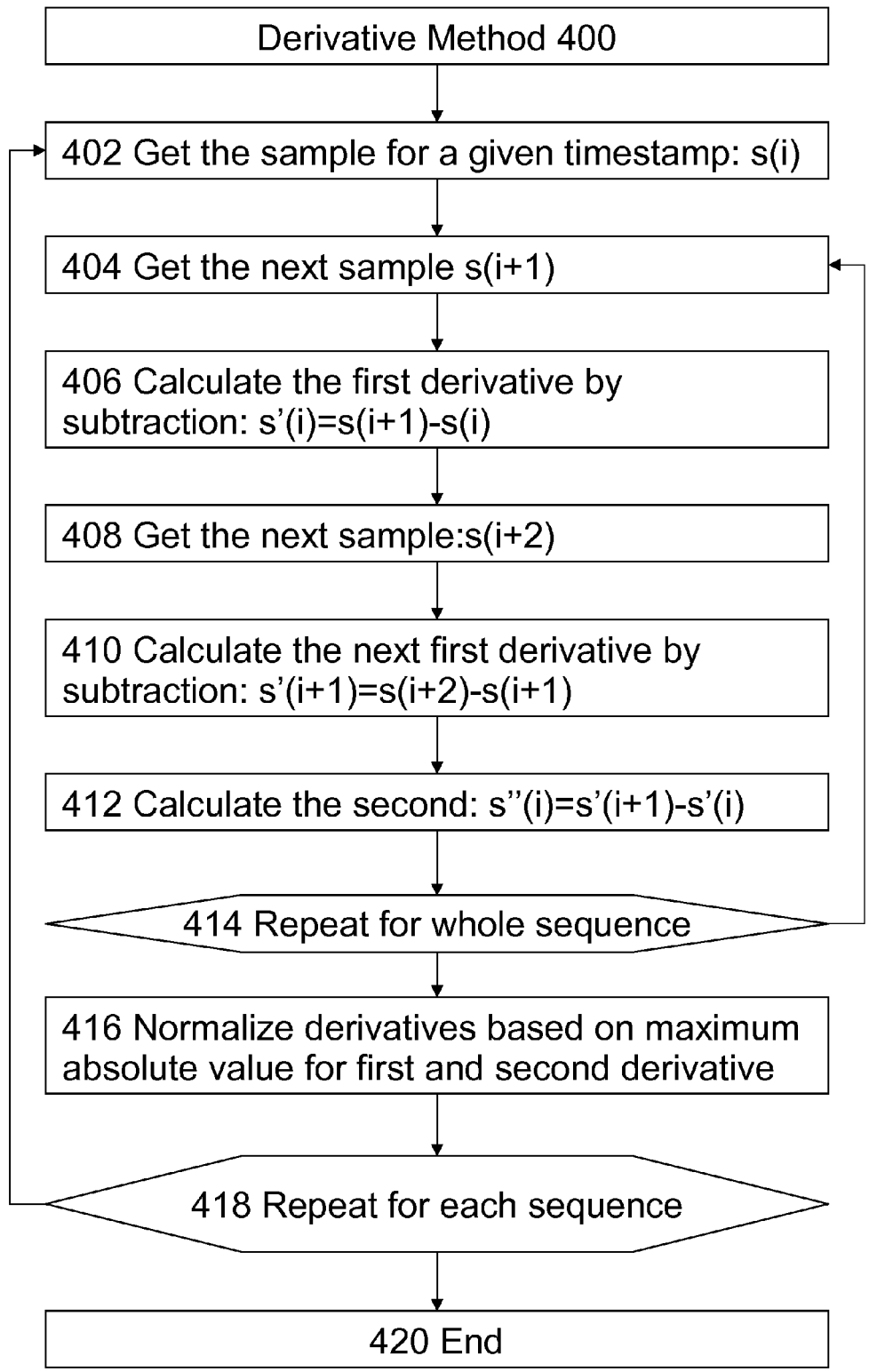
FIG. 4 is a process diagram of a sub-method of the correlation method of the preferred embodiment.

Referring to FIG. 4, derivative method 400 of the preferred embodiment of the invention comprises logical process steps 402 to 420. The description of the method assumes that the set of metric data consists of samples s1, s2, s3 of integer or real numbers collected at respective timestamps t1, t2, t3 . . . (where t1<t2<t3< . . . and t(i+1)−t(i)=const). The first derivative is calculated as: $s(i)' = (s(i+1)−s(i))/(t(i+1)−t(i))$. The second derivative is: $s(i)'' = (s'(i+1)−s'(i))/(t(i+1)−t(i))$. To simplify calculations, the method assumes that t(i+1)−t(i)=const=1 so that calculation of the derivatives is simplified as below. First derivative is calculated as: $s(i)' = (s(i+1)−s(i))$. The second derivative is: $s(i)'' = (s'(i+1)−s'(i))$.

Step 402 is for acquiring the sample for a given timestamp: s(i)

Step 404 is for acquiring the next sample: s(i+1)

Step 406 is for calculating the first derivative by subtraction: $s'(i) = s(i+1)−s(i)$ Step 408 is for acquiring the next sample: s(i+2)

Step 410 is for calculating the next first derivative by subtraction: $s'(i+1) = s(i+2)−s(i+1)$ Step 412 is for calculating the second derivative: $s''(i) = s'(i+1)−s'(i)$ Step 414 is for repeating method 400 from step 404 for whole set.

Step 416 is for calculating a maximum absolute value for the first and second derivative for use when dealing with noise effects of the metrics.

Step 418 is for repeating method 400 from step 402 for each sequence.

Step 420 is for ending the derivative method 400.

Figure 5:
FIG. 5 is an example event classification policy for the preferred embodiment.
Figure 5:
Figure 5:
Figure 5:
Figure 5:
Figure 5:
Figure 5:

Referring to FIG. 5, event classification policy 500 is defined. Seven types of graph are shown labeled A to G.

Classification A is for positive first derivative and a positive second derivative whereby a metric increasingly increases with time.

Classification B is for positive first derivative and a neutral second derivative whereby a metric increases constantly with time.

Classification C is for positive first derivative and a negative second derivative whereby a metric decreasingly increases with time.

Classification D is for neutral first derivative and a neutral second derivative whereby a metric remains constant with time.

Classification E is for negative first derivative and positive second derivative whereby a metric decreasingly decreases with time.

Classification F is for a negative first derivative and a neutral second derivative whereby a metric decreases constantly with time.

Classification G is for a negative first derivative and a negative second derivative whereby a metric increasingly decreases with time.

Referring to FIG. 6, an extension of event classification policy 500, event classification policy mapping 502, shows mapping inverse derivatives and respective inverse classifications. The inverse mapping would normally be included in the same table in a database but is shown separately in this description.

Figure 7:
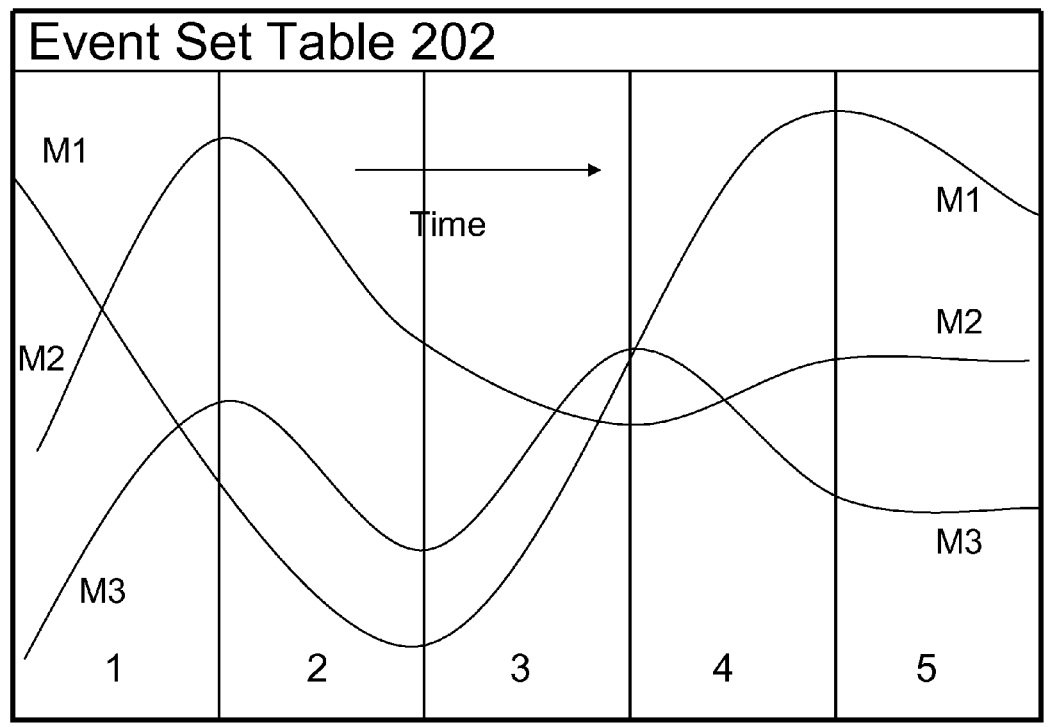
FIG. 7 is an example set of event curves for the data of an event set table under analysis by the embodiments.

Referring to FIG. 7, example event curves are described showing 3 metric curves M1, M2 and M3 from event set table 202 in time periods 1 to 5. There is a displaced anti-correlation on most of the timestamps between M1 and M2. There is some initial correlation between M2 and M3 and no correlation between M1 and M3. The distance between the curves does not matter but only shape.

Figure 8:
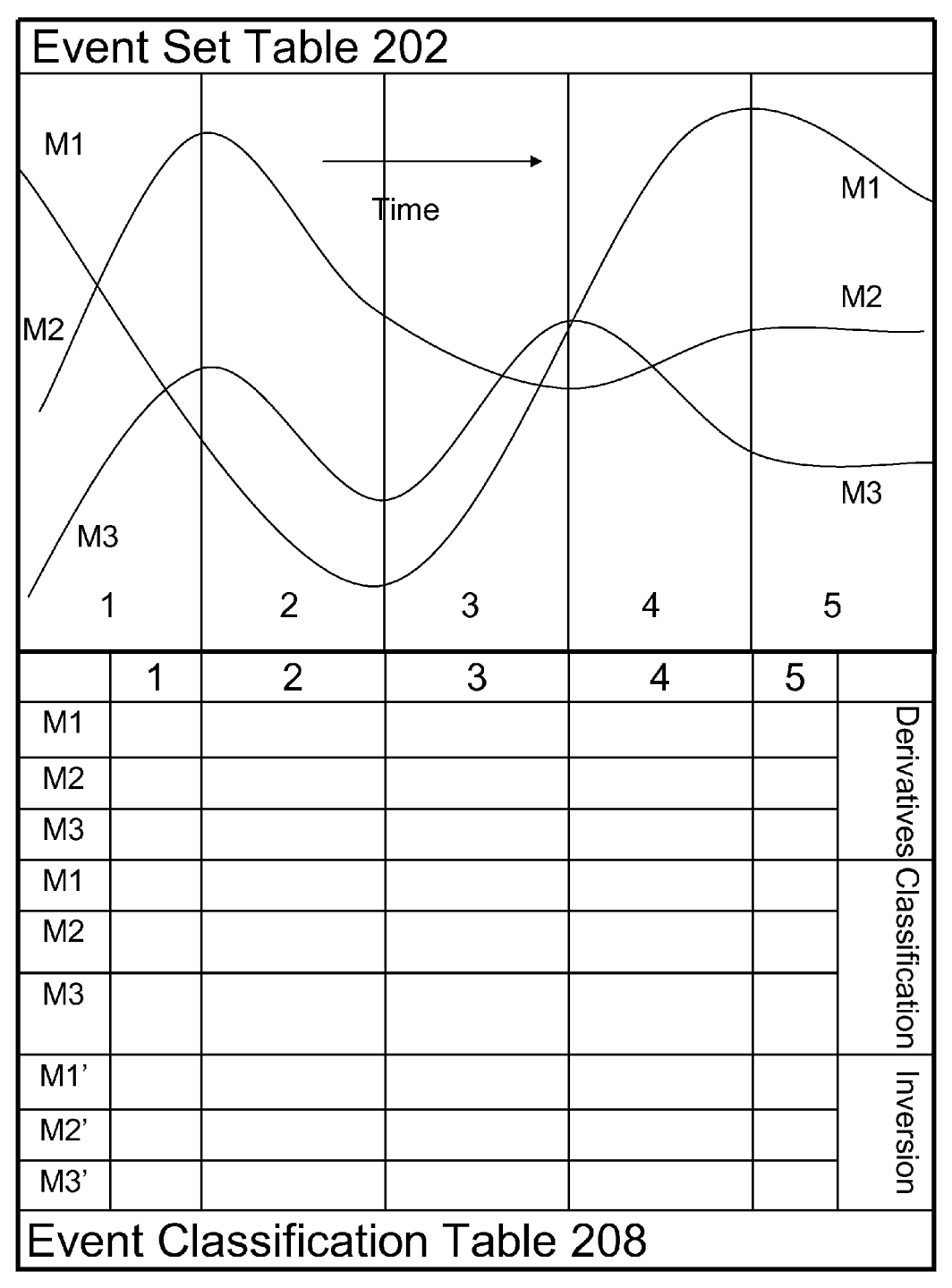

Referring to FIG. 8, event classification table 208 is shown aligned with curves M1, M2 and M3 of the example. Event classification table 208 is shown with five columns aligned with the five time periods in event set table 202 to represent correspondence. Event classification table 208 comprises nine rows that are used by the method of the preferred and second embodiments. In this example: the top three rows are for the derivatives of M1, M2 and M3; the middle three rows are for the classification of M1, M2 and M3; and the bottom three rows are for the classification inversion of M1, M2 and M3.

Figure 9:
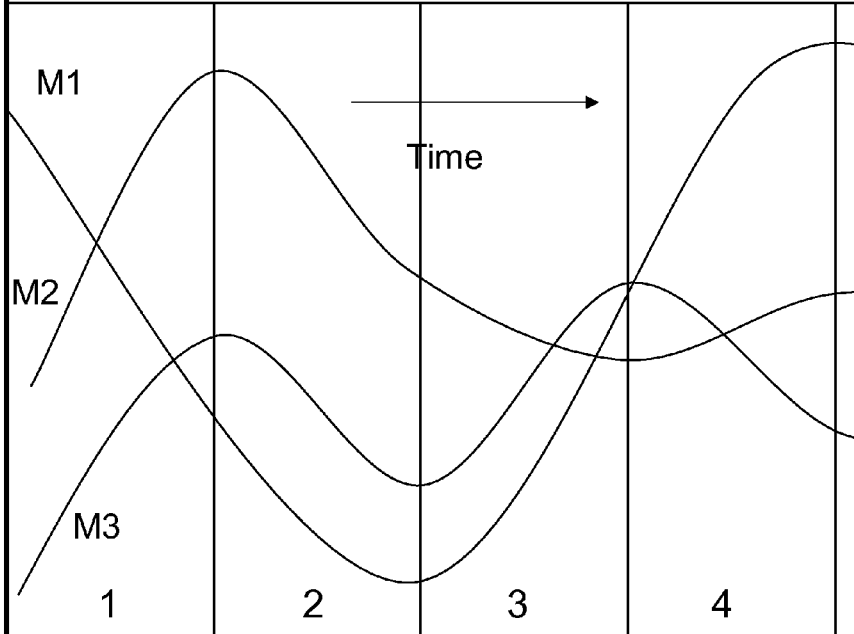
FIG. 9 shows first derivatives added to the event classification table of FIG. 8 in accordance with the preferred embodiment.

Referring to FIG. 9, derivatives of the curves of the example in FIG. 7 are shown in the top three rows of event classification table 208. The derivatives of curve M1 are explained. Curve M1 in T=1 descends decreasingly and is classified negative/positive according to the first and second derivative with respect to event classification policy 500. Curve M1 in T=2 also descends decreasingly and is classified negative/positive as before. Curve M1 in T=3 ascends increasingly and is classified positive/positive. Curve M1 in T=4 ascends decreasingly and is classified positive/negative. Curve M1 in T=5 ascends decreasingly and is classified positive/negative as well. Derivatives for curves M2 and M3 are calculated in line with the preferred embodiment.

Referring to FIG. 10, classification of derivatives of FIG. 9 is illustrated in the middle three rows of event classification table 208. The classification of curve M1 is described. Negative/positive curve M1 in T=1 is classified as E according to event classification policy 500. Negative/positive curve M1 in T=2 is also classified as E. Positive/positive curve M1 in T=3 is classified A. Positive/negative curve M1 in T=4 is classified C. Positive/negative curve M1 in T=5 is classified F. Curves M2 and M3 are classified similarly according to event classification policy 500.

Referring to FIG. 11, inversion of the derivatives of the example in FIG. 10 is shown in the last three rows of table 208. For M1: at T1 E inverts to C; at T=2 E inverts to C; at T=3 A inverts to G; at T=4 C inverts to E; and at T=5 F inverts to B. The inverse of M2 and M3 are similarly identified according the event classification policy mapping 502.

Figure 12:
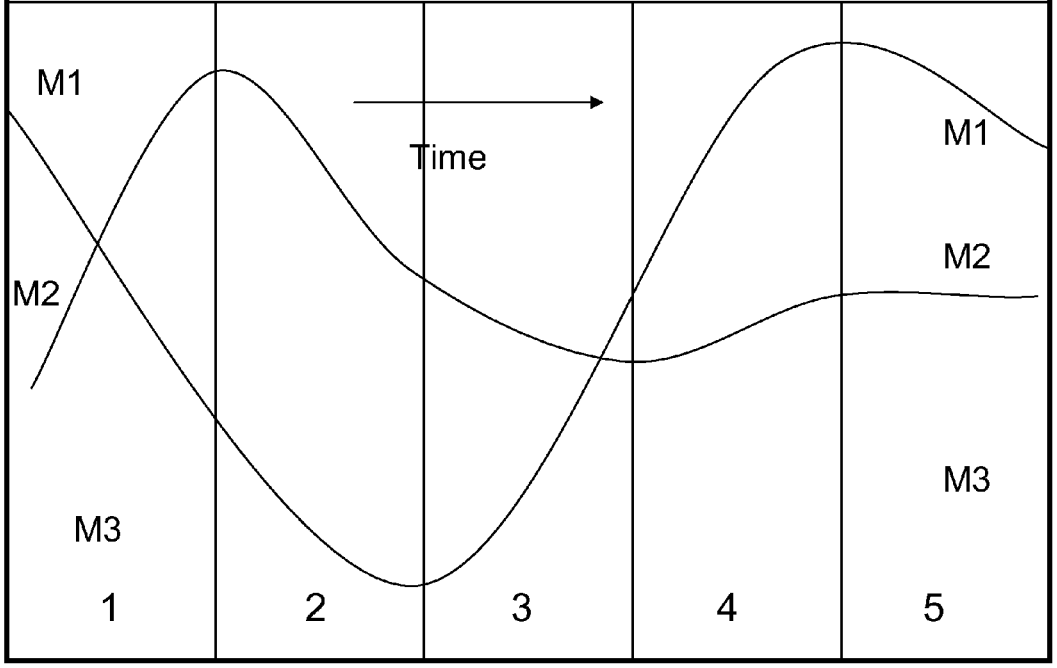
FIG. 12 highlights two sequences of similar classifications located from FIG. 11 in accordance with the preferred embodiment.

Referring to FIG. 12, after the classifying the data set, correlation method 300 discovers that certain patterns of classifications are more similar than others. For instance, M3 T=3 to T=5 is the same as inverted M2 (M2') T=3 to T5. These two most similar patterns are highlighted in bold boxes in FIG. 12 and over values in the table are not included for further emphasis.

FIG. 13 is an example event classification policy 500' with mapped inversions for the second embodiment. Sixteen combinations (A to O) of first, second and third derivatives together with inverted combinations and respective classifications are shown. The Classification column shows letters in ascending order. The inverse column shows letters in descending order by virtue of the logical arrangement of the derivatives.

FIG. 14 is an example set of event curves shown inside an event set table together with an event classification table that contains derivatives, classifications and inversions in accordance with the event classification policy 500' of second embodiment. The derivative calculations are performed in a similar way as to the preferred embodiment except for that three derivatives are found each time.

Figure 15:
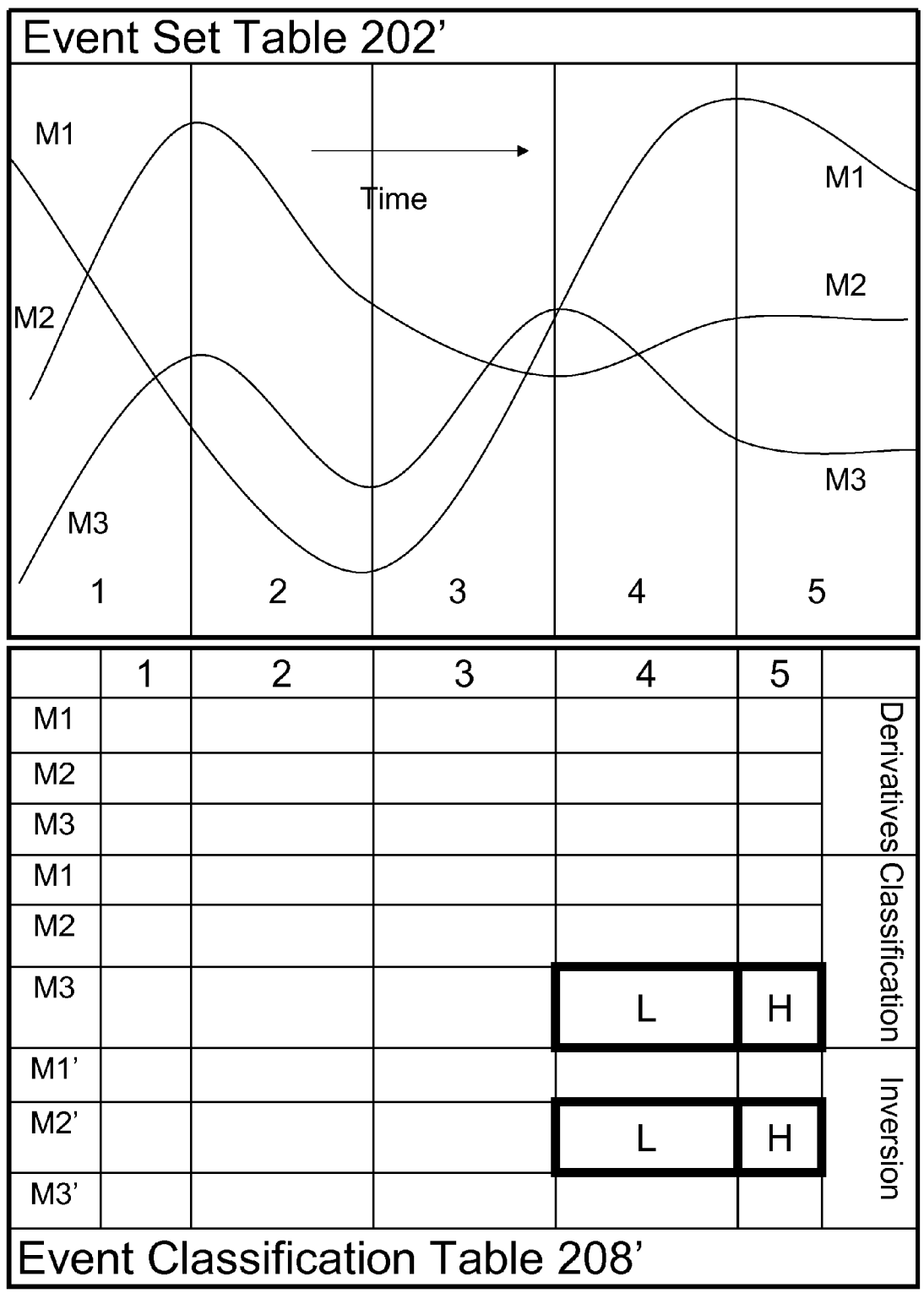
FIG. 15 highlights two sequences of similar classifications located from FIG. 14 in accordance with the second embodiment.

FIG. 15 highlights two sequences of similar classifications located from FIG. 14 in accordance with the second embodiment. These two most similar patterns are highlighted in FIG. 15 and in this case the curves M3 and inversion M2' correspond at T4 to T5.

Further embodiments of the invention are now described.

It will be clear to one of ordinary skill in the art that all or part of the method of the embodiments may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of the preferred embodiment may suitably be embodied in alternative logic apparatus or apparatuses comprising logic elements to perform equivalent functionality using equivalent method steps, and that such logic elements may comprise components such as logic gates in, for example, a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the additional logic apparatus and alternative logic apparatus described above may also suitably be carried out fully or partially in software running on one or more processors, and that the software may be provided in the form of one or more computer program elements carried on any suitable data-carrier such as a magnetic or optical disk or the like.

The embodiments may suitably be embodied as a computer program product for use with a computer system. Such a computer program product may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein and such computer readable instructions can be written in a number of programming languages for use with many computer architectures or operating systems. Further, such instructions may be stored using any memory technology, including but not limited to, semiconductor, magnetic, or optical. Such instructions may be transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

It will be clear to one skilled in the art that many improvements and modifications can be made to the foregoing exemplary embodiment without departing from the scope of the present invention.

The invention claimed is:

1. A system for comparing event data sets comprising:
a calculating engine for calculating one or more derivatives for each event in a first and second set of events;
a classifying engine for classifying each event by respective calculated derivatives; and
a correlating engine for correlating first and second sets of events based on the classifications of the respective events,
wherein each derivative is classified as a negative, zero or positive value and each event is classified according to a combination of negative, zero and positive values of the derivatives.

2. A system as claimed in claim 1, wherein a first derivative is approximated as a distance between two consecutive events divided by a difference of their time stamps.

3. A system as claimed in claim 2, wherein a second derivative is approximated as a distance between two consecutive first derivatives divided by the difference of the time stamps.

4. A system as claimed in claim 3, wherein a third derivative is approximated as a distance between two consecutive second derivatives divided by the difference of the time stamps.

5. A system as claimed in claim 2, wherein the difference in timestamps is a unit value.

6. A system as claimed in claim 2, further comprising a first derivative noise level as a fraction of a maximum derivative value whereby if the first derivative is between the absolute first derivative noise level then the first derivative is taken as neutral.

7. A system as claimed in claim 2, further comprising a smoothing engine for smoothing the metrics to reduce noise.

8. A computer program product for comparing event data sets comprising, the computer program product comprising a non-transitory computer readable storage device readable by a processing circuit and storing instructions for execution by the processing circuit for performing steps of:
calculating one or more derivatives for each event in a first and second set of events;
classifying each event by respective calculated derivatives; and
correlating first and second sets of events based on the classifications of the respective events, wherein each derivative is classified as a negative, zero or positive value and each event is classified according to a combination of negative, zero and positive values of the derivatives.

9. A computer program product as claimed in claim 8, wherein a first derivative is approximated as a distance between two consecutive events.

10. A computer program product as claimed in claim 8, wherein a first derivative is approximated as a distance between two consecutive events divided by a difference of their time stamps.

11. A computer program stored on a non-transitory computer readable device and loadable into the internal memory of a digital computer, comprising software code portions, when said program is run on a computer, for performing the steps of:

calculating one or more derivatives for each event in a first and second set of events;

classifying each event by respective calculated derivatives; and correlating first and second sets of events based on the classifications of the respective events, wherein each derivative is classified as a negative, zero or positive value and each event is classified according to a combination of negative, zero and positive values of the derivatives.

12. A computer program as claimed in claim 11, wherein a first derivative is approximated as a distance between two consecutive events.

13. A computer program as claimed in claim 11, wherein a first derivative is approximated as a distance between two consecutive events divided by a difference of their time stamps.

* * * * *